INVENTORS
ROBERT J. BERGMAN
JOHN P. KIERNAN
DEAN W. MORGAN
BY Thomas J. Nikolai
ATTORNEY Sept. 30, 1969 D. W. MORGAN ET AL 3,470,548

MATED-FILM MEMORY ELEMENT INCORPORATING E-KEEPERS
FORMING A CLOSED TRANSVERSE INTERROGATE FLUX PATH

Filed Feb. 20, 1967 3 Sheets-Sheet 2

INVENTORS
ROBERT J. BERGMAN
JOHN P. KIERNAN
DEAN W. MORGAN
BY Thomas J. Nikolai
ATTORNEY INVENTORS
ROBERT J. BERGMAN
JOHN P. KIERNAN
DEAN W. MORGAN
BY Thomas J. Nikolai
ATTORNEY

United States Patent Office 3,470,548
Patented Sept. 30, 1969

3,470,548

MATED-FILM MEMORY ELEMENT INCORPORATING E-KEEPERS FORMING A CLOSED TRANSVERSE INTERROGATE FLUX PATH

Dean W. Morgan, St. Paul, John P. Kiernan, Bloomington, and Robert J. Bergman, St. Paul, Minn., assignors to Sperry Rand Corporation, New York, N.Y., a corporation of Delaware Filed Feb. 20, 1967, Ser. No. 617,329
Int. Cl. G11b 5/00
U.S. Cl. 340—174 18 Claims

ABSTRACT OF THE DISCLOSURE

A magnetizable memory element that includes a plurality of ferromagnetic film layers that are formed in a stacked, superposed relationship. The element has a first portion that envelopes a suitable drive line, which first portion has overlapping sides that form closely-coupled mated-film portions on both sides of the drive line creating a substantially-closed first flux path about the enveloped drive line and that has a second portion that provides a second closed flux path to fields in the planes of said layers and orthogonal to the first flux path.

Background of the invention

The invention herein described was made in the course of or under a contract or subcontract thereunder, with the Department of the Army.

The present invention is an improvement in the mated-film memory element disclosed in the copending patent applications of K. H. Mulholland, Ser. No. 498,743, filed Oct. 20, 1965, now abandoned and of R. P. Halverson Ser. No. 503,364, filed Oct. 23, 1965, now Patent No. 3,353,169, both assigned to the Sperry Rand Corporation as is the present invention. The copending Mulholland application discloses a mated-film element that includes two thin-ferromagnetic film layers that are formed in a stacked, superposed relationship about a suitable drive line and whose overlapping sides form closely-coupled mated-film portions creating a substantially-closed flux path about the enveloped drive line. The envelope drive line is typically a common bit and sense line, used to sense the element's output during the read operation and to carry bit current during the write operation. The axis of anisotropy, or easy axis, is in the circumferential direction about the enveloped drive line, i.e., orthogonal to the longitudinal axis of the enveloped drive line, whereby the energized enveloped drive line provides a longitudinal drive field $H_l$ in a circumferential direction about the enveloped drive line in the area of the mated-film element causing the flux in the two layers of the mated-film element to become aligned in an anti-parallel relationship. A second drive line, preferably a printed circuit member running over and returning under the mated-film element, is oriented with its longitudinal axis parallel to the easy axis of the mated-film element whereby the enveloping drive line when coupled by an appropriate current signal produces a transverse drive field $H_t$ in the area of the mated-film element. The resulting product constitutes a memory cell that possesses all the desirable characteristics of a planar, thin-ferromagnetic-film memory element while being substantially unaffected by the creep phenomenon.

The copending patent application of R. P. Halverson discloses an improvement of the copending patent application of Mulholland wherein the enveloping word line of the Mulholland application is replaced by a word line that envelopes the mated-film element but is oriented in the area of the mated-film element with its longitudinal axis orthogonal to the plane of and to the easy axis of the mated-film element whereby the enveloping word line, when coupled by appropriate current signals produces a transverse drive field $H_t$ in the area of the mated-film element. Additionally, the thin-ferromagnetic-film layers that form the mated-film element also provide the closed flux path for energized word line drive fields providing a low reluctance, substantially-closed flux path for the transverse drive field $H_t$ provided by the energized word line. This packaging technique provides a highly efficient and compact three-dimensional matrix array described in detail in the copending patent application of R. J. Bergman et al., Ser. No. 504,543, filed Oct. 24, 1965, now Patent No. 3,435,435 and assigned to the Sperry Rand Corporation as is the present application.

Summary of the invention

The present invention is a further improvement of such copending applications in that there is provided herein a mated-film memory element that includes a plurality of ferromagnetic film layers and current conductive members that may be formed in a continuous deposition process. In the present invention, in contrast to the copending application R. P. Halverson, the layers that form the transverse flux path are not part of the same layers that form the mated-film element. Accordingly, the layers that form the mated-film element may be formed of a different material under more rigid control than that required of the layers forming the transverse flux path. Accordingly, it is a primary object of the present invention to provide an improved mated-film memory element.

The mated-film memory element of the present invention includes a plurality of ferromagnetic film layers and current conductive members. The element includes a first layer of two mirror-image E-keepers of ferromagnetic material, a second layer of three ferromagnetic elements connecting the opposing legs of the E-keepers, a third layer of a current conducting material centered on and passing over the first center connecting element of the second layer, and a fourth layer, second center connecting element. The first and second center connecting elements rent conductor between it and the first center connecting element. The first and second center connectig elemets overlap the conductive member forming closely-coupled mated-film portions on both sides of the current conducting member creating a substantially-closed first flux path about the enveloped current conductor. The E-keepers and the top and bottom connecting elements provide closed flux paths in the plane of the layers orthogonal to the first flux path for interrogate fields generated by energized interrogate word lines passing through the apertures formed by the E-keepers and their connecting elements.

Description of the preferred embodiments

Figures 1, 6, 7, 8:
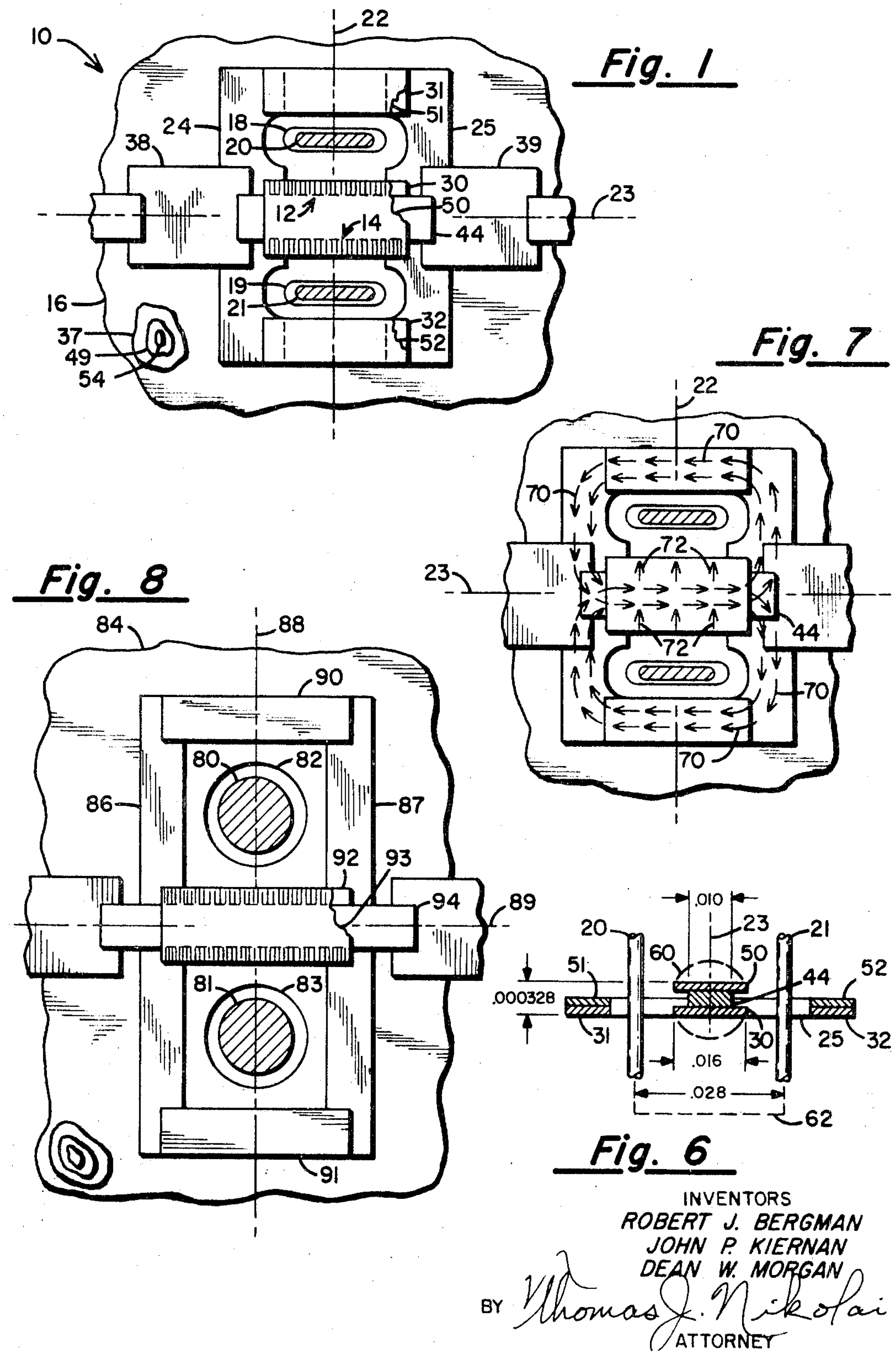
FIG. 1 is an illustration of a plan view of a mated-film element of the present invention.
FIG. 6 is a diagrammatic illustration of a cross section of element 10 taken along axis 22 of FIG. 1.
FIG. 7 is a diagrammatic illustration of the general configuration of the transverse flux $H_t$ and the longitudinal flux $H_e$ in element 10.
FIG. 8 is another embodiment of the present invention.

With particular reference to FIG. 1 there is presented an illustration of the plan view of the mated-film element 10 of the present invention. As discussed in more detail in the above discussed copending patent application of K. H. Mulholland, the mated-film element achieves its unique operating characteristic, as compared to coupled-film elements, due to the sandwiched arrangement of the ferromagnetic film layers and the enveloped common bit-sense line. The two ferromagnetic film layers that are formed in a stacked, superposed relationship about the bit line have sides overlapping the enveloped bit line whereby there are formed at the overlapping sides closely-coupled mated-film portions of such film layers that create a substantially-closed flux path about the enveloped bit line. The shaded areas defining these closely-coupled mated-film areas of memory element 10 of FIG. 1 are identified by the reference numerals 12 and 14.

Element 10 is composed of a plurality of stacked, superposed layers some having a contour or shape that is specifically designed to permit the fabrication thereof in a continuous series of discrete deposition steps wherein there are utilized a plurality of shape defining "masks," one for each layer, for the definition of the outline, or planar contour, of the different layers. Element 10 is formed in the following steps:

(A) The base element of element 10 is a planar glass substrate 16 of 0.006 inch thickness that has a pair of spaced-apart apertures 18, 19 therethrough; apertures 18, 19 provide the openings through which the to-be-discussed word lines 20, 21 pass perpendicularly through the plane of substrate 16. Axes 22, 23 are here utilized only to define the major and minor axes, respectively, of element 10 for purposes of orienting the elements and magnetic axes thereof.

Figure 2:
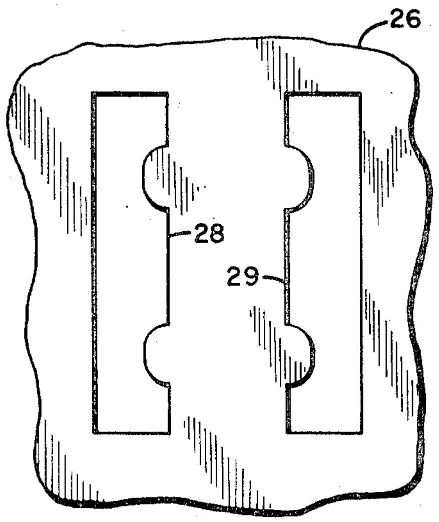
FIG. 2 is an illustration of a portion of a mask defining the outline of the E-keepers of the present invention.

(B) Upon a top surface of substrate 16 and about apertures 18, 19 are vapor deposited two E-shaped ferromagnetic film layers 24, 25 each of 10,000 Angstroms (A.) in thickness and approximately 80% Ni-20% Fe and having an anisotropic axis aligned with axis 22 providing an easy axis thereby. With particular reference to FIG. 2 there is illustrated a portion of mask 26 having apertures 28, 29 therethrough each defining the contour of layers 24, 25 respectively, when utilized in a continuous deposition process such as disclosed in the S. M. Rubens et al. Patent No. 3,155,561.

Figure 3:
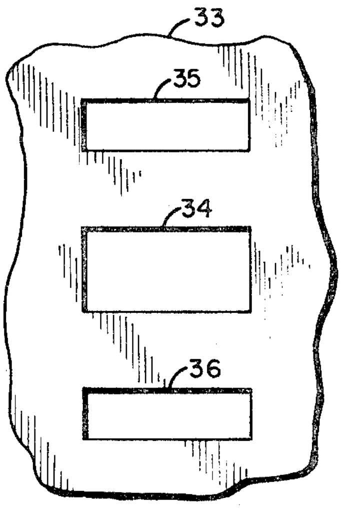
FIG. 3 is an illustration of a portion of a mask defining the outline of the elements connecting the opposing legs of the E-keepers.

(C) Next, upon layers 24, 25 and centered along axis 22 and about axis 23 are vapor deposited three ferromagnetic film layers 30, 31 and 32 each of 4,000 A. in thickness and approximately 80% Ni-20% Fe and having an anisotropic axis aligned with axis 22 providing an easy axis thereby. With particular reference to FIG. 3 there is illustrated a portion of a mask 33 having apertures 34, 35 and 36 therethrough, each defining the contour of layers 30, 31 and 32, respectively, when utilized in a continuous deposition process as discussed above.

(D) Next, a silicon monoxide (SiO) layer 37 of 5,000 A. in thickness is vapor deposited upon the element of step C above.

Figure 4:
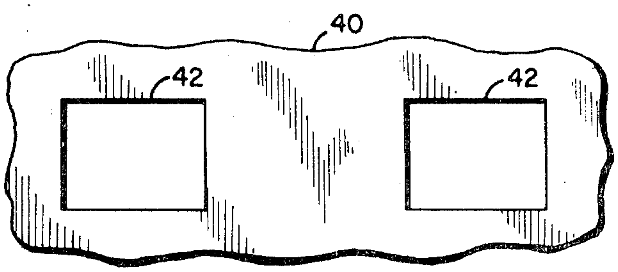
FIG. 4 is an illustration of a portion of a mask defining the outline of the current conductor interconnecting elements.

(E) Next, upon layer 37 and centered along axis 23 and about axis 22 are vapor deposited two copper interconnecting strips 38, 39 of approximately 40,000 A. in thickness. With particular reference to FIG. 4 there is illustrated a portion of a mask 40 having a plurality of apertures 42 therethrough each defining the contour of a corresponding strip 38, 39 when utilized in a continuous deposition process as discussed above.

Figure 5:
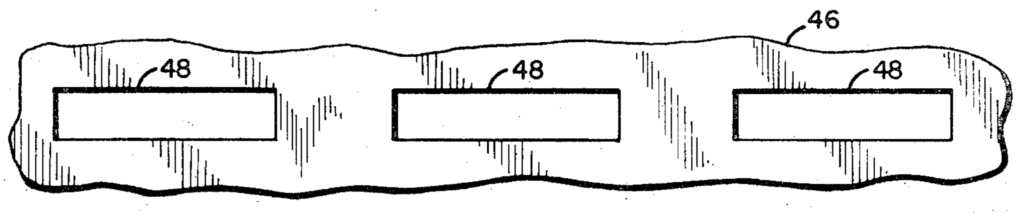
FIG. 5 is an illustration of a portion of a mask defining the outline of the current conductor lying across the center connector and interconnecting the interconnecting elements of FIG. 4.

(F) Next, upon layer 37 and centered along axis 23 and about axis 22 and extending over the ends of strips 38, 39 so as to form a continuous electrical circuit therewith is vapor deposited copper bit line 44 of approximately 40,000 A. in thickness. With particular reference to FIG. 5 there is illustrated a portion of mask 46 having a plurality of apertures 48 therethrough each defining the contour of a strip 44 when utilized in the continuous deposition process as discussed above.

(G) Next, a SiO layer 49 of 5,000 A. in thickness is vapor deposited on the element of step F above.

(H) Next, upon layer 49 and superposed corresponding layers 30, 31 and 32 are vapor deposited three ferromagnetic film connecting element layers 50, 51 and 52 each of 4,000 A. in thickness and approximately 80% Ni-20% Fe and having an anisotropic axis aligned with axis 22 providing an easy axis thereby. Elements 50, 51 and 52 may be formed in a continuous deposition process utilizing mask 33 of FIG. 3 as discussed in step B above.

(I) Lastly, a SiO layer 54 of approximately 2,500 A. in thickness is vapor deposited over the entire stacked assembly for the sealing thereof.

It is to be appreciated that the above steps A–I are presented as an exemplary method of forming a mated-film memory element of the present invention; the specific dimensions and materials discussed not being critical to an operative embodiment of the present invention. As stated in the copending patent application of K. H. Mulholland it is desirable that the magnetization M in area 60 rotate in the single-domain mode as taught in the above referenced S. M. Rubens Patent No. 3,030,612. Accordingly, the layers 30, 50 should possess single-domain properties as discussed in the above referenced copending patent application of R. P. Halverson. In contrast, the other layers not performing a memory function, such as layers 24, 25, 31 and 32, need not possess the same magnetic-characteristics as the layers performing the memory function, such as layers 30, 50. As an example, it is known that the magnetic characteristics of such film layers of magnetizable material of approximately 80% Ni-20% Fe may be effected by their differing thicknesses and the differing thicknesses of the isolating layers of SiO.

It is desirable that the non-memory layers have a lower $H_c$ than the memory layers while still providing the low reluctance flux path for the transverse drive fields $H_t$ so as not to adversely effect memory operation. Accordingly, the fabrication of the mated-film memory element 10 of FIG. 1 may be other than as expressly given in steps A–I above. As an example, in one embodiment the non-memory layers were formed in successive depositions of ten layers of 80% Ni-20% Fe of 1,000 A. in thickness each isolated by a layer of SiO of 200 A. in thickness while the memory layers were formed in successive depositions of four layers of 80% Ni-20% Fe of 1000 A. in thickness each isolated by a layer of SiO of 1500 A. in thickness. This relationship of magnetizable layer thickness and isolation layer thickness achieved memory layers of a relatively high $H_c$ and non-memory layers of a relatively low $H_c$ providing the most desirable memory operation characteristics.

It is known by the applicants that the insulating layers of SiO, in the area of area 60 (see FIG. 6), provide poor electrical insulating characteristics when element 10 is fabricated in a continuous deposition process. Due to the changing environmental conditions (temperature, pressure etc.) within the evacuatable enclosure during the deposition process and to the irregular surfaces of the metallic layers, the layers of SiO may develop pinhole and crack-like apertures therethrough through which the currents flowing through the bit line may short through to the metallic layers. Consequently, to ensure desirable operation thereof, each element 10 is electrically insulated, by no two elements 10 having common magnetizable material, from each other whereby there is prevented the possibility of the shorting of parallel, groups of three adjoining lines 38, 39 and 44. Further, as word lines 20, 21 may be uninsulated copper wires, as an example, uninsulated copper strip of .003 inch in thickness and .015 inch in width, it is desirable that no magnetizable material be permitted to form on or to be deposited along the walls of the apertures 18, 19 and substrate 16 so as to permit the shorting of a word line 20, 21 through the magnetizable layers 24, 25, 30, 31, 32, 50, 51, and 52.

As stated above the layers of SiO provide poor electrical insulating characteristics. However, the layers of SiO are essential in the continuous deposition process to prevent the diffusion of the layers of magnetizable material and copper, particularly in the area of area 60. With the magnetic characteristics of memory area 60 being critical for the proper operation of element 10 it is essential that the diffusion between such metals be prevented. Additionally, as only layers 30, 50 enveloping bit line 44 operate in the memory function the other magnetizable layers could be of a differing magnetizable material deposited under less rigorous conditions than under those conditions which the layers 30, 50 are fabricated. Accordingly, although such layers of SiO are not relied upon to provide electrical insulating characteristics such layers are utilized to preclude contamination of the magnetizable layers during the continuous deposition process.

It is desirable that no magnetizable material be permitted to form upon the walls of apertures 18, 19 of substrate 16 for reasons other than to preclude the possibility of the shorting of a word line 20, 21 to a bit line 44. As disclosed in the aforementioned K. H. Mulholland application, area 60, see FIG. 6, is the memory or active area of element 10 in which the binary information is written and from which the binary information is read. As the magnetizable material in the mated-film areas defined by numerals 12, 14 of FIG. 1 play little or no part in providing an output signal in bit line 44 but do provide an area of high permeability, i.e., low reluctance, to the transverse drive field $H_t$ represented by arrows 70 of FIG. 7 it is desirable that the amount of magnetizable material in the mated-film areas 12, 14 be kept to a minimum such that the transverse drive field $H_t$ be concentrated in the area of area 60 contiguous to bit line 44. Accordingly, it is desirable that no magnetizable material be formed along the walls of apertures 18, 19 in substrate 16 and that the amount of magnetizable material in the mated-film areas defined by numerals 12, 14 of FIG. 1 be kept to a minimum consistent with the requirements of producibility and operability of element 10.

With particular reference to FIG. 6 there is presented a diagrammatic illustration of a cross-section of element 10 taken along axis 22 of FIG. 1 with the passive members such as substrate 16 and layers 37, 49 and 54 omitted for the sake of clarity. FIG. 6 points out the approximate dimensions of the memory area 60 of element 10 of the illustrated embodiment as indicating a width-to-thickness ratio of approximately 50. Further, with layers 30, 50 forming the memory area 60 there are illustrated the transverse drive field $H_t$ flux closing paths effected by the layers 24, 25, 31, 32, 51 and 54 that close the otherwise open flux paths of layers 30, 50 about the word lines 20, 21. In consideration of the above noted dimensions of the element of FIG. 6 it is to be appreciated that such illustration is schematic only with no intention to show comparative sizes, etc.

Inspection of the plan view of element 10 illustrated in FIG. 1 and the cross sectional view of element 10 illustrated in FIG. 6 indicates that element 10 has in its plan view the general form of a numeral 8 wherein two closed flux loops meet at a central, intersectional area formed by superposed layers 30, 50. The members 31, 51 and 32, 52 connect the top and bottom legs, respectively, of layers 24, 25 forming closed flux paths thereby. This arrangement is, as discussed hereinabove, to provide two closed flux paths in the plane of element 10 that have a common portion in area 60 defined by superposed layers 30, 50.

The memory plane assembly formed by the sandwiched construction of substrate 16 through layer 54 (not including word lines 20, 21) is an integral package and preferably is formed by a continuous deposition process as disclosed in the aforementioned S. M. Rubens patents. In this arrangement of the preferred embodiment the magnetizable layers 24, 25, 30, 31, 32, 50, 51, and 52 are formed with an anisotropic axis parallel to axis 22 whereby a current signal coupled to conductive strip 44 establishes a longitudinal drive field $H_1$ particularly in layers 30, 50 in memory area 60 in a circumferential direction about bit line 44 of a first or second and opposite direction representative of a stored "1" or a "0" as a function of the polarity of the current signal applied thereto. With the proper current signal coupled to intercoupled word lines 20, 21 (by a conductive strip 62, see FIG. 6) there is established in area 60 a transverse drive field $H_t$ that tends to align the magnetization M of layers 30, 50, in area 60 into substantial alignment along the hard axis of area 60, i.e., that lies along a line parallel to axis 23.

With particular reference to FIG. 7 there is illustrated a plan view of element 10 that illustrates the general configuration of the path of the magnetic flux generated by current signals flowing through word lines 20, 21 and bit line 44. With a suitable current signal coupled through word lines 20, 21 there is established about such word lines a magnetic field represented by arrows 70 flowing in a circumferential direction thereabout. This circumferential field about lines 20, 21 seeks a path of low reluctance, and, accordingly, concentrates in the paths presented by layers 24, 25, 30, 31, 32, 50, 51, and 52. Further, with a suitable current signal coupled to bit line 44 there is established in area 60 a magnetic field represented by arrows 72 flowing in a circumferential direction about bit line 44 of a first or second and opposite direction representative of a stored "1" or "0" as a function of the polarity of the current signal applied thereto. This magnetic flux in area 60 is a longitudinal drive field $H_1$ oriented parallel to the easy axis of area 60 that is aligned with axis 22 and tends to cause the magnetization M of area 60 to become aligned with axis 22. With the magnetic fields schematically illustrated by arrows 70 and 72 established by suitable current signals flowing through word lines 20, 21 and bit line 44 being, in area 60, in substantial alignment with axis 23 and axis 22, respectively, there are provided two magnetic fields orthogonal to each other in area 60 that are vectorially additive such that by the proper selection of the relative field intensities the magnetization M of area 60 may be established into any one of a plurality of previously determined magnetic states in the rotational mode as disclosed in the S. M. Rubens et al. Patent No. 3,030,612.

With particular reference to FIG. 8 there is illustrated another embodiment of the present invention particularly directed towards an arrangement whereby the word lines 80, 81 are of a circular cross section adapted to mate with circular apertures 82, 83, respectively, in substrate 84. The constituent elements of this embodiment may be substantially the same as those of the corresponding elements of the illustrated embodiment of FIG. 1. In this embodiment the side members 86, 87 are analogous to the members 24, 25 of FIG. 1 and are rectangular strips symmetrically oriented on either side of major axis 88 and symmetrically oriented about minor axis 89. Connecting strips 90, 91 are analogous to connecting elements 31, 32 of FIG. 1 which along with center connecting strips 92, 93 sandwiching bit line 94 therebetween form closed flux paths for the transverse drive field $H_t$ created by energized word lines 80, 81 much in the same manner as in the embodiment of FIG. 1. Due to the circular cross section of word lines 80, 81 this embodiment is not as compact as that of the embodiment of FIG. 1, it being of approximately the same width, i.e., the dimension along minor axis 89 but of substantially twice the length, i.e., along major axis 88.

Figure 9:
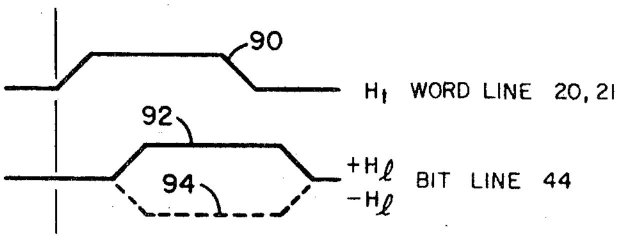
FIG. 9 is an illustration of the waveforms of typical write current signals that may be utilized by the present invention.

With particular reference to FIG. 9 there are illustrated the waveforms of the current signals utilized to accomplish the writing operation of element 10. In this arrangement transverse drive field 90 is initially applied to element 10 by a current signal flowing through word lines 20, 21 rotating the magnetization M of area 60 out of alignment with its anisotropic axis 22. Next, longitudinal drive field 92, for the writing of a "1," or longitudinal drive field 94, for the writing of a "0," is applied in area 60 by suitable polarity current signals coupled to bit line 44 which longitudinal drive field $H_1$ steers the magnetization M of area 60 into the particular magnetic polarization along anisotropic axis 22 that is associated with the respective polarities of waveforms 92 and 94.

Figure 10:
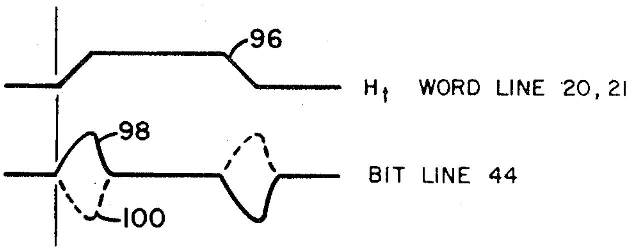
FIG. 10 is an illustration of the waveforms of typical read current signals that may be utilized by the present invention.

With particular reference to FIG. 10 there are illustrated the signal waveforms associated with the reading operation of element 10. The readout operation is accomplished by the coupling of an appropriate current signal to word lines 20, 21 generating in area 60 a transverse drive field 96 that is below the reversible limit of the memory area 60. This drive field $H_t$ rotates the magnetization M of area 60 out of alignment with its anisotropic axis 22 inducing in the common bit-sense line 44 an output signal 98 or 100 indicative of a stored "1" or "0," respectively, in area 60. As illustrated here, the polarity phase of the output signal during a readout operation is indicative of the informational state of the memory area 10 concerned.

Thus, it is apparent that there has been described and illustrated herein a preferred embodiment of the present invention that provides an improved mated-film memory element permitting the utilization of different magnetizable materials in the ferromagnetic film layers that form the mated-film memory portion and of the ferromagnetic film layers that form the closed flux path for the transverse drive field $H_t$ generated by the energized word lines.

It is understood that suitable modifications may be made in the structure as disclosed provided that such modifications come within the spirit and scope of the appended claims. Having, now, fully illustrated and described our invention, what we claim to be new and desire to protect by Letters Patent is set forth in the appended claims.

We claim:

1. A magnetizable memory element, comprising:

a substrate member having a top surface and having first and second apertures therethrough for forming a web therebetween;

said apertures oriented along a major axis and about a minor axis, said axes oriented orthogonal to each other and in the plane of said top surface;

first and second opposing layers of a high permeability material oriented about said major axis on said top surface and along opposite sides of said apertures;

a first connecting element of a layer of magnetizable material magnetically coupling the middle portions of said opposing layers and oriented along said web on said top surface;

second and third connecting elements on said top surface, each of a layer of high permeability material magnetically coupling the top and bottom portions, respectively, of said opposing layers for closing the otherwise open flux paths about said first and second apertures;

a current conductive strip on said top surface and superposed said first connecting element and oriented about said minor axis;

a fourth connecting element of a layer of magnetizable material on said top surface and superposed said first connecting element enveloping and sandwiching said conductive strip therebetween with said first and fourth connecting elements having portions overlapping said enveloped conductive strip for forming closely-coupled mated-film portions on said top surface for creating a substantially-closed flux path about said enveloped conductive strip;

said superposed first and fourth connecting elements and said enveloped conductive strips forming a memory area on said top surface;

binary information stored in said memory area in a first or a second and opposite circumferential flux direction about said enveloped conductive strip.

2. The memory element of claim 1 further including:

first and second insulating layers for insulating said layers from said conductive strip.

3. The memory element of claim 2 wherein said first and second insulating layers are diffusion-preventing layers for preventing the diffusion of the magnetizable material of said first and fourth connecting strips and of the material of the conductive strip during the deposition thereof.

4. The memory element of claim 2 wherein said first and fourth connecting elements are thin-ferromagnetic-film layers having single-domain properties and have the property of uniaxial anisotropy for providing in the plane of said film layers an easy axis along which film layers' remanent magnetization shall reside in a first or second and opposite direction, and wherein the longitudinal axis of said conductive strip is orthogonal to said film layers' easy axes.

5. The memory element of claim 4 wherein the coercive force $H_c$ of said first and second opposing layers is substantially less than that of said first and fourth connecting elements.

6. The memory element of claim 5 wherein said first and second opposing layers are each formed of successive layers of magnetizable material that are substantially isolated from each other by a layer of insulating material.

7. The memory element of claim 6 wherein said first and fourth connecting elements are each formed of successive layers of magnetizable material that are substantially isolated from each other except in said overlapping portions by a layer of insulating material.

8. The memory element of claim 7 further including:

first and second intercoupled word lines passing through first and second apertures and enveloping said memory area;

an energized first and second word line generating first and second planar magnetic fields, respectively, thereabout, which planar fields are conducted along the substantially-closed planar flux paths presented by said magnetizable and high permeability layers about said apertures and into said memory area.

9. The memory element of claim 8 wherein an energized said conductive strip generates in said memory area first or second and opposite circumferential magnetic fields;

said planar magnetic fields and said circumferential fields vectorially additive in said memory area for setting the magnetization of said memory area in a first or second and opposite circumferential direction about said conductive strip as a first or second informational state; respectively, and said planar magnetic fields in said memory area effecting the remanent magnetization of said memory area for inducing in said enveloped conductive strip a signal whose polarity phase is indicative of the informational state of said memory area.

10. A magnetizable memory element, comprising:

a substrate member having a top surface and first and second apertures therethrough for forming a web therebetween;

said apertures oriented symmetrically along a major axis and about a minor axis, said axes oriented orthogonal to each other and in the plane of said top surface;

first and second opposing E-keepers of a layer of magnetizable material on said top surface and oriented about said minor axis with the legs thereof partially encompassing said apertures;

a first connecting element of a layer of magnetizable material magnetically coupling the middle legs of said opposing E-keepers and oriented along said minor axis along said web on said top surface;

second and third connecting elements on said top surface, each of a layer of magnetizable material magnetically coupling the top and bottom legs, respectively, of said opposing E-keepers for closing the otherwise open flux paths about said first and second apertures;

a current conductive strip on said top surface and superposed said first connecting element and oriented symmetrically about said minor axis;

a fourth connecting element on said top surface and superposed said first connecting element enveloping and sandwiching said conductive strip therebetween with said first and fourth connecting elements having portions overlapping said enveloped conductive strip for forming closely-coupled mated-film portions on said top surface for creating a substantially-closed flux path about said enveloped conductive strip and along said major axis;

said superposed first and fourth connecting elements and said enveloped conductive strips forming a memory area on said top surface;

binary information stored in said memory area in a first or a second and opposite circumferential flux direction about said enveloped conductive strip and along said major axis.

11. The memory element of claim 10 further including:

first and second insulating layers for insulating said layers of magnetizable material from said conductive strip.

12. The memory element of claim 11 wherein said first and second insulating layers are diffusion-preventing layers for preventing the diffusion of the magnetizable material and of the material of the conductive strip during the deposition thereof.

13. The memory element of claim 12 wherein said first and fourth connecting elements are thin-ferromagnetic-film layers having single domain properties and have the property of uniaxial anisotropy for providing in the plane of said film layers an easy axis along which film layers' remanent magnetization shall reside in a first or second and opposite direction, and wherein the longitudinal axis of said conductive strip is orthogonal to said film layers' easy axes.

14. The memory element of claim 13 wherein the coercive force $H_c$ of said first and second opposing layers is substantially less than that of said first and fourth connecting elements.

15. The memory element of claim 14 wherein said first and second opposing layers are each formed of successive layers of magnetizable material that are substantially isolated from each other by a layer of insulating material.

16. The memory element of claim 15 wherein said first and fourth connecting elements are each formed of successive layers of magnetizable material that are substantially isolated from each other except in said overlapping portions by a layer of insulating material.

17. The memory element of claim 16 further including:

first and second intercoupled word lines passing through first and second apertures and enveloping said memory area;

an energized first and second word line generating first and second planar magnetic fields, respectively, thereabout, which planar fields are conducted along the substantially-closed planar flux paths presented by said magnetizable layers about said apertures and into said memory area.

18. The memory element of claim 17 wherein an energized said conductive strip generates in said memory area first or second and opposite circumferential magnetic fields;

said planar magnetic fields and said circumferential fields vectorially additive in said memory area for setting the magnetization of said memory area in a first or second and opposite circumferential direction about said conductive strip as a first or second information state; respectively, and said planar magnetic fields in said memory area effecting the remanent magnetization of said memory area for inducing in said enveloped conductive strip a signal whose polarity phase is indicative of the informational state of said memory area.

References Cited

UNITED STATES PATENTS

| | | | |
|---|---|---|---|
| 3,305,845 | 2/1967 | Grace et al. | 340—174 |
| 3,382,491 | 5/1968 | Bergman | 340—174 |

STANLEY M. URYNOWICZ, JR., Primary Examiner

GARY M. HOFFMAN, Assistant Examiner